United States Patent [19]

Raistakka

[11] 3,772,891
[45] Nov. 20, 1973

[54] CONDUIT STRUCTURE FOR MIGRATING FISH

[76] Inventor: John E. Raistakka, 1414 S.W. 12th Ave., Portland, Oreg.

[22] Filed: Oct. 20, 1971

[21] Appl. No.: 191,045

[52] U.S. Cl. .................... 61/21, 43/42.06, 119/3
[51] Int. Cl. ............................................ E02b 8/08
[58] Field of Search ................ 61/18, 21; 43/42.06; 119/3; 138/40

[56] References Cited
UNITED STATES PATENTS

| | | | |
|---|---|---|---|
| 2,121,968 | 6/1938 | Kuehl | 61/21 |
| 841,662 | 1/1907 | Branch | 61/21 |
| 1,722,596 | 7/1929 | Ross | 61/21 |
| 2,174,657 | 10/1939 | Helsel | 61/21 |
| 3,453,768 | 7/1969 | Feaster et al. | 43/42.06 |

Primary Examiner—David J. Williamowsky
Assistant Examiner—David H. Corbin
Attorney—James D. Givnan, Jr.

[57] ABSTRACT

A conduit for the passage of fish about a dam or other obstruction with the end segments of the conduit being vertically positionable by winch means to best suit migrating fish. The conduit ends are in submerged placement upstream and downstream from the dam or obstruction with the main portion of the conduit being of a constant gradient to facilitate fish passage. Baffle means are spaced along the conduit interior to cause the water flow therethrough to be in an eddying manner to provide a series of resting zones for the migrating fish. Means are provided for adding a fish attracting substance to the conduit flow.

2 Claims, 7 Drawing Figures

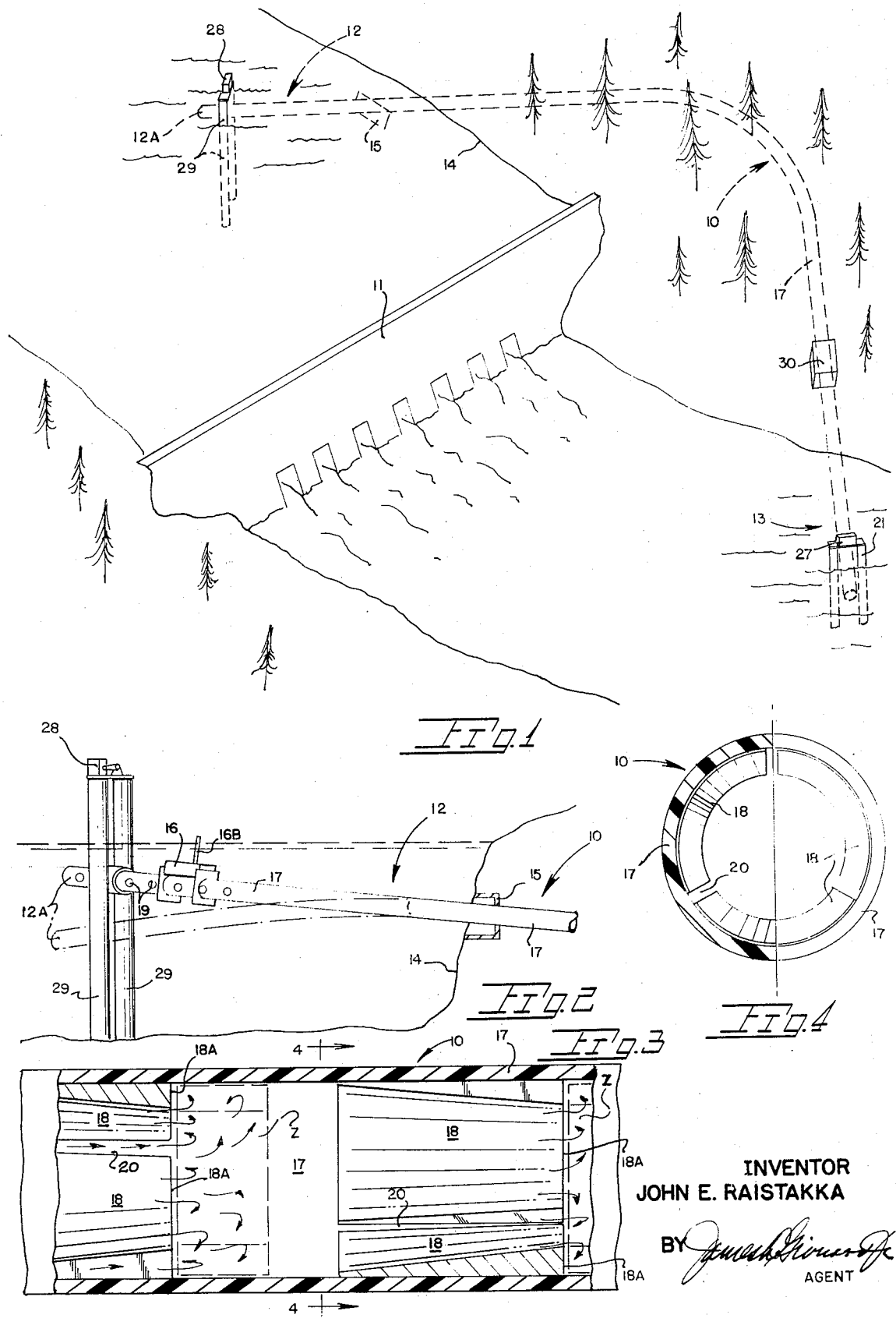

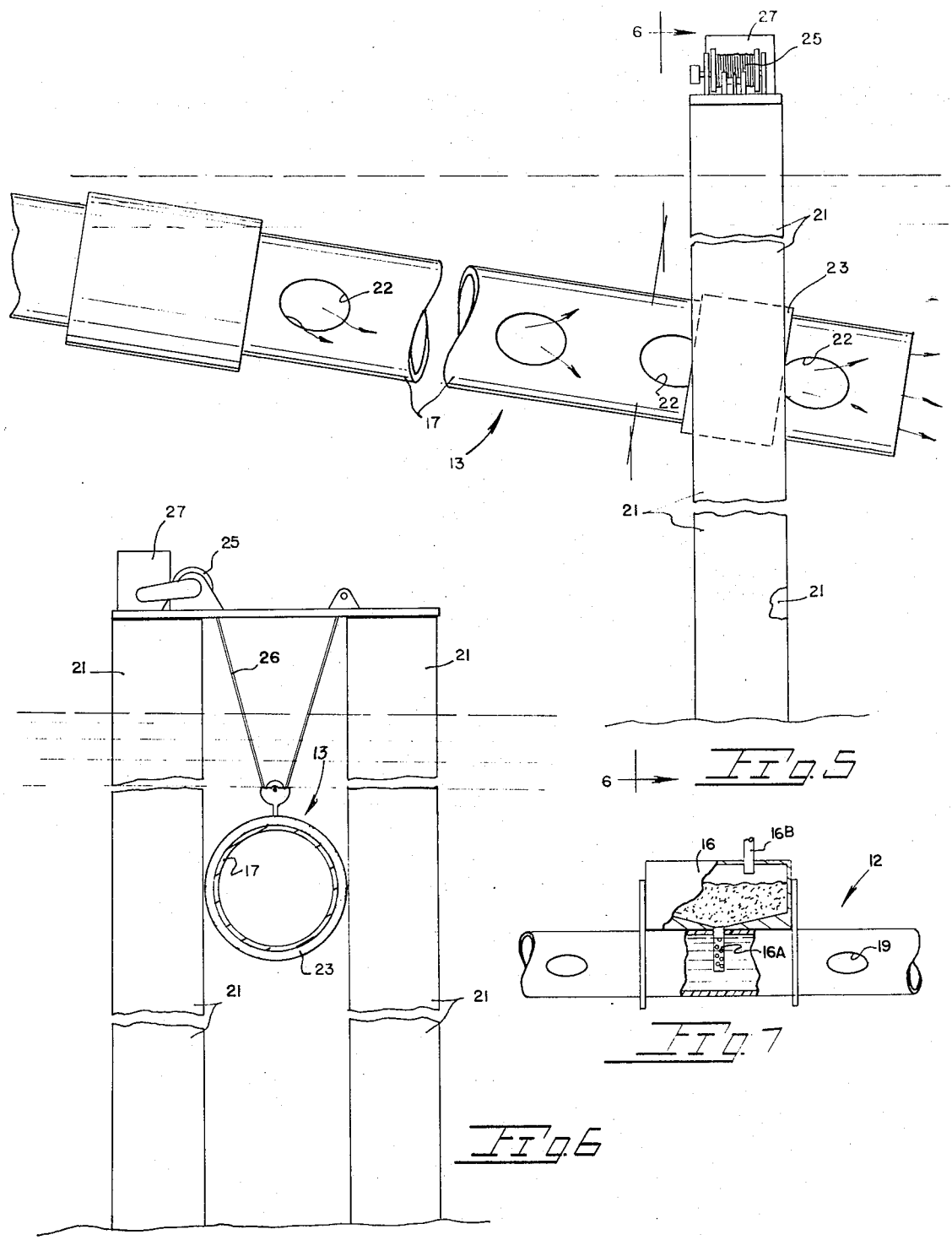

CONDUIT STRUCTURE FOR MIGRATING FISH

BACKGROUND OF THE INVENTION

The present invention relates to a conduit for migrating fish enabling the passage of fish past a waterway obstruction, such as for example, a dam. To the extent known, fish ladder structures characteristically include a series of resting pools of step-like graduated levels, the vertical weir distance between each pool being such that the fish can successfully swim upwardly through same to the next pool and eventually back to the river upstream of the dam. The calm water of each pool permits the fish to rest prior to swimming the next weir.

Present fish ladder structures are open to the atmosphere with the water cascading through each weir causing the nitrogen content of the water to be progressively increased. The excessive aerating of the water has been suspected by some individuals as the source of an excessive nitrogen content in fish resulting in substantial numbers of fish being killed prior to completing their migration. Recent efforts have disclosed that the nitrogen level in most rivers, supporting migratory fish life, has increased to a critical point thus making it desirable to restrict the addition of further nitrogen from whatever source. While the increase in nitrogen cannot be attributed solely to aerated water coming through fish ladder structures such aerating along with other spillways of a dam does contribute to a severe concentration of nitrogen below dams. Further, the time spent in water supersaturated with nitrogen by a fish is considerable in view of the duration required for fish passage through a conventional fish ladder.

A further drawback to existing fish ladder structures is the construction cost of same part of which is attributable to expensive regulating equipment for the control of the water volume passing therethrough.

SUMMARY OF THE INVENTION

The present invention is directed towards providing a fish conduit closed from the atmosphere, through which migrating fish may circumvent a dam.

Important to the present invention is a conduit structure having its ends terminating upstream and downstream of a dam. The conduit terminates in segments projecting in a submerged manner outwardly into the river with said segments being flexible to a degree to permit vertical positioning of the conduit ends for optimum fish ingress and egress.

An important object of the present invention is to provide a suitable fish conduit closed from the atmosphere to prevent the addition of nitrogen to the water passing through the conduit.

Another important object of the present invention is the provision of a conduit for the passage of migrating fish wherein a constant gradient and substantially constant water flow facilitate fish passage. Spaced along the conduit are series of flow disrupting projections which cause the water to form areas of eddying water currents providing resting areas for the fish.

Another important object is the provision of winch means operable in conjunction with submerged conduit end segments to raise and lower same as best suits fish migration purposes. Such means may be remotely controlled and settable according to fluctuating water levels.

An additionally important object is the provision of means for feeding a fish attracting substance into the conduit water to help overcome the natural tendency of fish to shy away from conduit entry.

The foregoing and other objects will become readily apparent upon an understanding of the following specification.

BRIEF DESCRIPTION OF THE DRAWINGS

In the accompanying drawings:

FIG. 1 is a perspective view of the present fish conduit structure in place circumventing a dam, FIG. 2 is an elevational view of the upstream end of the fish conduit and support means therefor, FIG. 3 is a sectional view of a typical segment of conduit, FIG. 4 is a vertical sectional view of the fish conduit taken along line 4—4 of FIG. 3 with the broken away portion of the parent figure shown in phantom lines, FIG. 5 is a side elevational view of the downstream end of the fish conduit showing supporting means therefor, FIG. 6 is an elevational view similar to FIG. 5 taken along line 6—6 thereof, and FIG. 7 is a side elevational view of a container for metering a fish attracting substance into the conduit.

DESCRIPTION OF PREFERRED EMBODIMENTS

With continuing attention to the accompanying drawings wherein applied reference numerals indicate parts similarly identified in the following specification, the reference numeral 10 indicates generally the fish conduit embodying the present invention disposed in circumventing relationship to a dam 11. The conduit 10, in similarity to a conventional fish ladder structure, provides a passageway for fish moving upstream and primarily those species of fish migrating to spawning areas. In the northwestern part of the United States fish ladder structures or fish passageways are necessary to permit migratory runs of salmon to reach spawning areas and hence the preservation of the salmon fishing industry.

An upstream end of the conduit is indicated generally at 12 while oppositely a downstream conduit end segment is indicated generally at 13. Each end segment of the conduit can be adjusted vertically, by means later described, to best suit the passage of fish therethrough. As water levels fluctuate, both above and below dams, the conduit end segments may be positioned with respect to the water level.

In FIG. 2 the upstream end segment 12 is shown projecting outwardly from a river bank 14, the segment extending through an encasement 15 providing a seal about the pipe segment 12. The projecting segment 12 of the conduit is several feet in length to permit its outer end at 12A to be moved within an upright arc relative to the water surface. Openings at 19 in the conduit facilitate both fish entry or exit depending on the direction of migration. The flexibility of the outwardly projecting span of conduit segment 12 is shown by broken lines in FIG. 2 with the pipe preferably formed of a vinyl resin such as poly vinyl chloride. The conduit so constructed is of rigid wall construction with flexing of the end segments 12 and 13 being due to the inherent flexibility of a span of several feet of conduit. Indicated at 16 on the upstream conduit segment 12 is a container 16 (FIGS. 2 and 7) for reception of a supply of fish attracting substance which enters the conduit flow via an apertured outlet 16A. The container 16 is submerged with the conduit segment 12 with replenishing of the container 16 being by direct access to same by raising of said segment above the water surface or by a supply line 16B.

The present invention is concerned with the conduit structure and particularly its internal configuration for imparting a desired eddying flow to the water passing therethrough. In conventional fish ladder structures resting pools are provided for the fish below each of the ladders spillways whereas the instant fish conduit provides resting areas for the fish by means in internally directed projections formed within the main portion of conduit 10. A further distinction lies in the fact that the present conduit may be of a constant gradient as opposed to the step-like arrangement of alternate resting pools and spillways of a conventional fish ladder structure.

The pipe conduit structure includes a cylindrical wall 17 of the pipe with internal formations or baffles 18 being disposed in series along the inner wall of the conduit. The formations or baffles 18 are shown in the form of longitudinally spaced series of circumferentially disposed ramps each imparting an inward direction to the passing water flow. A downstream edge 18A of each baffle causes a turbulent or eddying flow of water generally outwardly toward the conduit wall 17 as shown by the applied arrows. Accordingly an annularly shaped zone, indicated at Z, of eddying water currents is provided downstream of each series of baffles 18 with each zone defining an area of reduced water velocity where the fish may rest prior to continuing their conduit passage. The baffles 18 are circumferentially spaced in segments to provide water passages 20 intermediate the ramps of each series the water flow therethrough also indicated by applied arrows. The longitudinal spacing between each series of ramps 18 will be somewhat dependent upon the gradient of the conduit and the rate of water flow therethrough.

While the formations or baffles 18 are shown in FIG. 3 and described as being of ramp-like configuration the same may take other forms within the purview of the present invention. Similarly conduit material, other than the aforementioned plastic, may dictate other configurations of the baffles 18.

The downstream segment 13 of the fish conduit 10 is best shown in FIG. 5, wherin a multitude of apertures at 22 are provided to facilitate fish ingress. Further the openings 22 serve to diffuse the water flow to reduce the rate of flow to further facilitate fish entry.

Downstream segment 13 is adjustably supported by a pair of stanchions 21 with the conduit end being confined for vertical movement intermediate same. With continuing reference to FIGS. 5 and 6 a collar 23 is circumposed adjacent the conduit segment end to act as a spacer and a wearing surface against the stanchions 21.

Remotely controlled winch means is indicated at 25 having a cable 26 entrained thereon with winch operation serving to retrieve or alternatively pay out the cable to consequently elevate or lower conduit end 13. A motor and suitable reduction drive is housed at 27 with said motor being of the reversible type with controls therefor being remotely located on shore. The foregoing description of the winch apparatus is also applicable to a winch apparatus 28 disposed on the pair of stanchions indicated at 29 associated with the upstream pipe segment 12.

A second container at 30 may be located in place on the buried portion of the fish conduit 10 with the container 30 being periodically resupplied via a supply line similar to that indicated at 16B of the first described container 16.

In operation the end segments 12 and 13 of the fish conduit are vertically positioned with respect to the water surface with factors determining such positioning including the water depth at which migrating salmon travel and the rate of flow through the conduit. The fish entering the end of the downstream pipe segment 13 via its end opening or the openings 22 spaced therealong, will progressively move through the series of baffles 18 and zones Z of eddying water whereat the fish will avoid the direct force of the water flow. The conduit is fully occupied with water hence aerating and the undesirable addition of nitrogen is avoided.

The conduit water flow past the outlet 16A of container 16 will cause dissemination of the fish attracting substance some of which will flow outwardly of conduit segment 12 through openings 19 therein to attract fish migrating downstream into the conduit. The second container at 30 supplements the substance initially added by upstream container 16 with the substance thereby added serving to attract fish into the conduit structure.

While I have shown but one embodiment of the invention it will be apparent to those skilled in the art that the invention may be embodied still otherwise without departing from the spirit and scope of the invention.

Having thus described the invention what is desired to be secured under a Letters Patent is:

1. A conduit structure closed from the atmosphere through which migrating fish may circumvent a waterway obstruction, said conduit structure comprising, a length of tubular conduit disposed in circumventing relationship to the waterway obstruction with end segments of the conduit being vertially positionable and submerged upstream and downstream of the obstruction, said conduit having at least one of its end segments provided with multiple apertures to facilitate entry of fish, said length of conduit fully occupied by water flowing therethrough, remotely controlled winch means disposed adjacent the upstream and downstream conduit segments for imparting vertical movement thereto whereby the depth of said segments may be varied to best accommodate the entry and exit of migrating fish, means circumferentially spaced about the interior wall surface of said conduit at spaced apart intervals therealong to impart an eddying flow to the water creating zones of random water currents constituting resting areas for fish migrating through the conduit.

2. The conduit structure as claimed in claim 1 additionally including a container for receiving a supply of fish attracting substance, said container in communication with the interior of the conduit via a container outlet located within said conduit with the outlet serving to meter the discharge of the substance into the conduit.

* * * * *